United States Patent [19]
Yachida

[11] Patent Number: 4,509,044
[45] Date of Patent: Apr. 2, 1985

[54] DEVICE WHICH ACCURATELY DISPLAYS CHANGES IN A QUANTITY TO BE MEASURED

[75] Inventor: Yoichi Yachida, Nagaoka, Japan

[73] Assignee: Nippon Seiki Kabushiki Kaisha, Nigata, Japan

[21] Appl. No.: 376,237

[22] Filed: May 7, 1982

[30] Foreign Application Priority Data

May 13, 1981 [JP] Japan ................................ 56-71919
Jun. 9, 1981 [JP] Japan ................................ 56-89110

[51] Int. Cl.³ .............................................. G09G 3/00
[52] U.S. Cl. ................................... 340/789; 340/791;
340/802; 73/295; 73/313; 364/509; 324/103 P; 377/19; 377/39; 377/45
[58] Field of Search ................. 73/308, 312, 313, 314, 73/295; 340/802, 789, 791; 377/19, 39, 45, 112; 324/103 P; 364/509

[56] References Cited
U.S. PATENT DOCUMENTS 4,165,458  8/1979  Koizumi ................................. 377/19
4,402,048  8/1983  Tsuchida et al. ................ 364/509 X
4,418,417 11/1983  Uchida ............................. 377/45 X Primary Examiner—Marshall M. Curtis
Assistant Examiner—Vincent P. Kovalick
Attorney, Agent, or Firm—Burgess, Ryan and Wayne

[57] ABSTRACT

Sampling data output in the form of digital signals corresponding to changes in a quantity to be measured within a predetermined period or an average value of the sampling data is compared with display data corresponding to the current display. When the accumulation signal obtained by accumulation of the difference between the sampling data and display data exceeds a predetermined value, or an average value having a predetermined difference from the current display data has been counted a predetermined times, the display data is updated.

4 Claims, 7 Drawing Figures

FIG. I

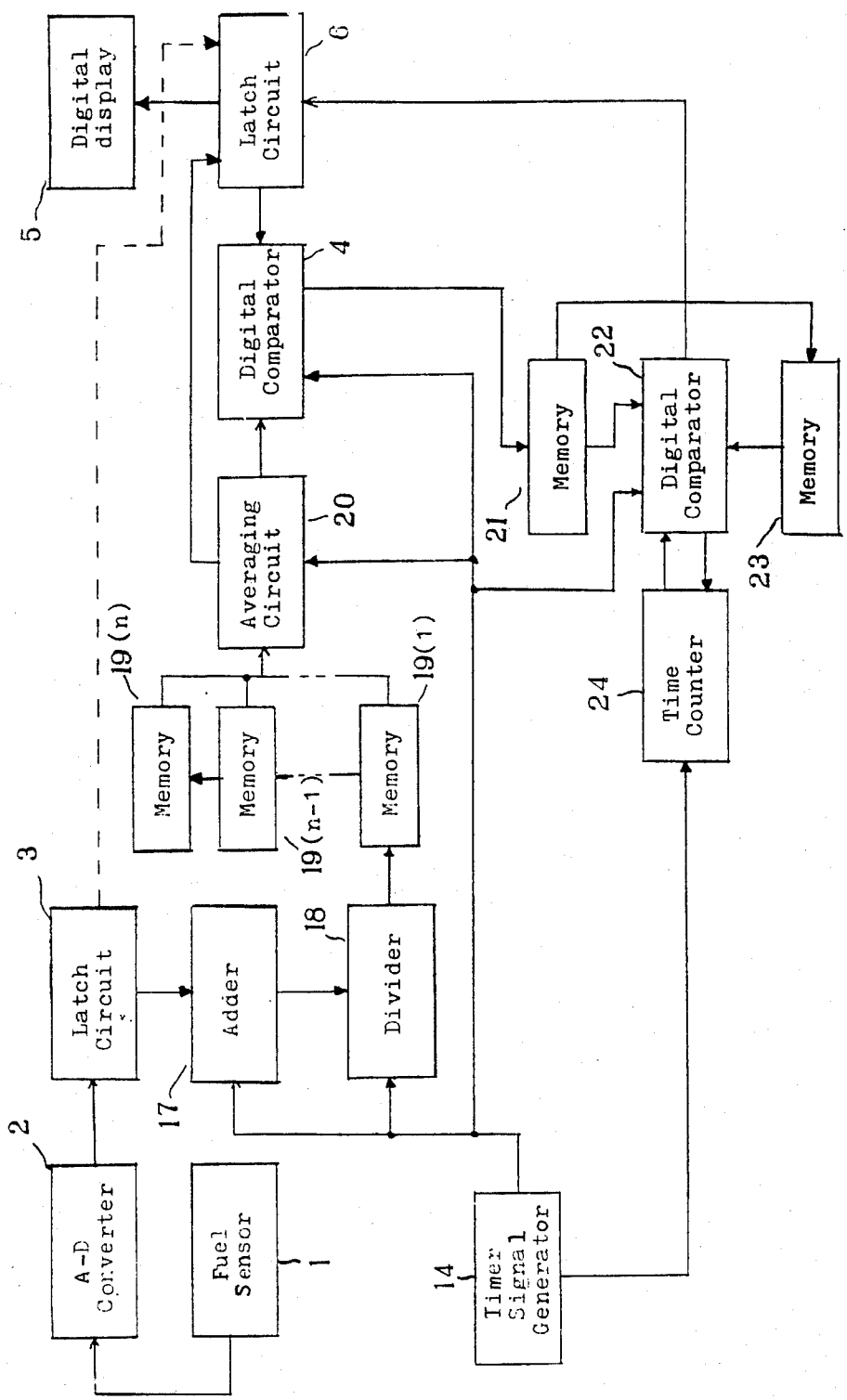
F I G. 6

: 1

DEVICE WHICH ACCURATELY DISPLAYS CHANGES IN A QUANTITY TO BE MEASURED

BACKGROUND OF THE INVENTION

The present invention relates to a display device adapted for a digitally detecting and displaying changes in a quantity to be measured such as for a fuel meter for an automobile, wherein flicker of display attributable to fluctuations in fuel level caused by vibrations is prevented, so that electronic display may be provided with good response.

In order to electrically detect and display a quantity to be measured which irregularly changes by external factors such as residual amount of fuel in a fuel tank, there is known a method which incorporates a flow rate sensor and a counter. The flow rate sensor arranged in a fuel passage generates a pulse signal upon every flow of a predetermined amount of fuel. The pulse signals are supplied to the counter which has a preset count corresponding to the initial fuel level and which counts down upon reception of each pulse signal. With this method, flicker attributable to level fluctuations due to vibrations does not occur and display of a residual amount of fuel can be performed with a relatively high precision. However, with this method, since the detection error of the flow rate sensor is accumulated, a flow rate sensor of high precision must be used. Furthermore, presetting of the initial fuel level, more specifically, setting of the fuel amount after a filling up which is the sum of a residual fuel amount and a newly filled fuel amount largely depends upon the display precision of fuel supply equipment and other factors. This has impaired correct presetting of the initial fuel level. Another method is also known which incorporates a float and a unit having a sliding resistance in the fuel tank. According to this method, the resistance is varied according to the vertical movement of the unit with the fluctuations in the position of the float or fuel level. Then, fluctuations in the voltage dividing level are detected to directly detect the fuel residual amount. The voltage dividing level is A-D converted to allow digital display. However, with this method, fluctuations in the fuel level caused by vibrations of a vehicle are immediately detected as changes in the voltage dividing level, resulting in more frequent flicker of the display. For allowing digital or analog display of the vehicle speed, a mechanism is generally adopted wherein a signal of a frequency corresponding to the rotational frequency of the vehicle wheels or transmission mechanism is generated. These signals are counted with a predetermined period to transfer the speed data to the display device. However, the rotational frequency of the vehicle wheels frequently irregularly changes due to the non-smooth surface of the road or the like. Naturally, the signal corresponding to such frequency fluctuates, so that the digital display is also subject to flicker and this indication is very hard to read.

As a means for preventing flicker of the display due to such external factors, a method has been proposed wherein, only when the same change in the large or small value between the display data corresponding to the present display value and the sampling data formed by the output of the sensor continues over a predetermined period of time, is the present display value changed by the changed value as a current measuring value. Although this method may prevent unnecessary frequent fluctuations in the display, it is simultaneously subject to the problem of slow response to actual changes in the fuel level. More specifically, with this method, if sampling data having the reverse relation to the display data is input even once due to external factors during a predetermined period of time for discriminating the large or small relation between the display data and the sampling data, the display may not be updated by the immediately reverse change of the sampling data due to external factors although the sampling data is changed by the actual change in the fuel level.

SUMMARY OF THE INVENTION

It is, therefore, an object of the present invention to provide a display device which eliminates flicker of display due to fluctuations in a quantity to be measured due to external factors.

It is another object of the present invention to provide a display device with improved response to normal changes in a quantity to be measured.

In order to achieve the above and other objects of the present invention, there is provided a display device comprising sampling means for sampling, with a predetermined period, digital signals corresponding to changes in a quantity to be measured; comparing means for comparing sampling data from said sampling means with display data at a display to generate a difference signal; accumulating means for accumulating the difference signal generated by said comparing means to output an accumulation signal; and discriminating means for discriminating a large or small relation between the accumulation signal from said accumulating means and a predetermined value, said discriminating means producing an output signal to update the display data according to the sampling data if said discriminating means discrimates that the accumulation signal has exceeded the predetermined value.

BRIEF DESCRIPTION OF THE DRAWINGS

FIG. 6 is a block diagram of a display device according to still another embodiment of the present invention.

DESCRIPTION OF THE PREFERRED EMBODIMENTS

Figure 1:
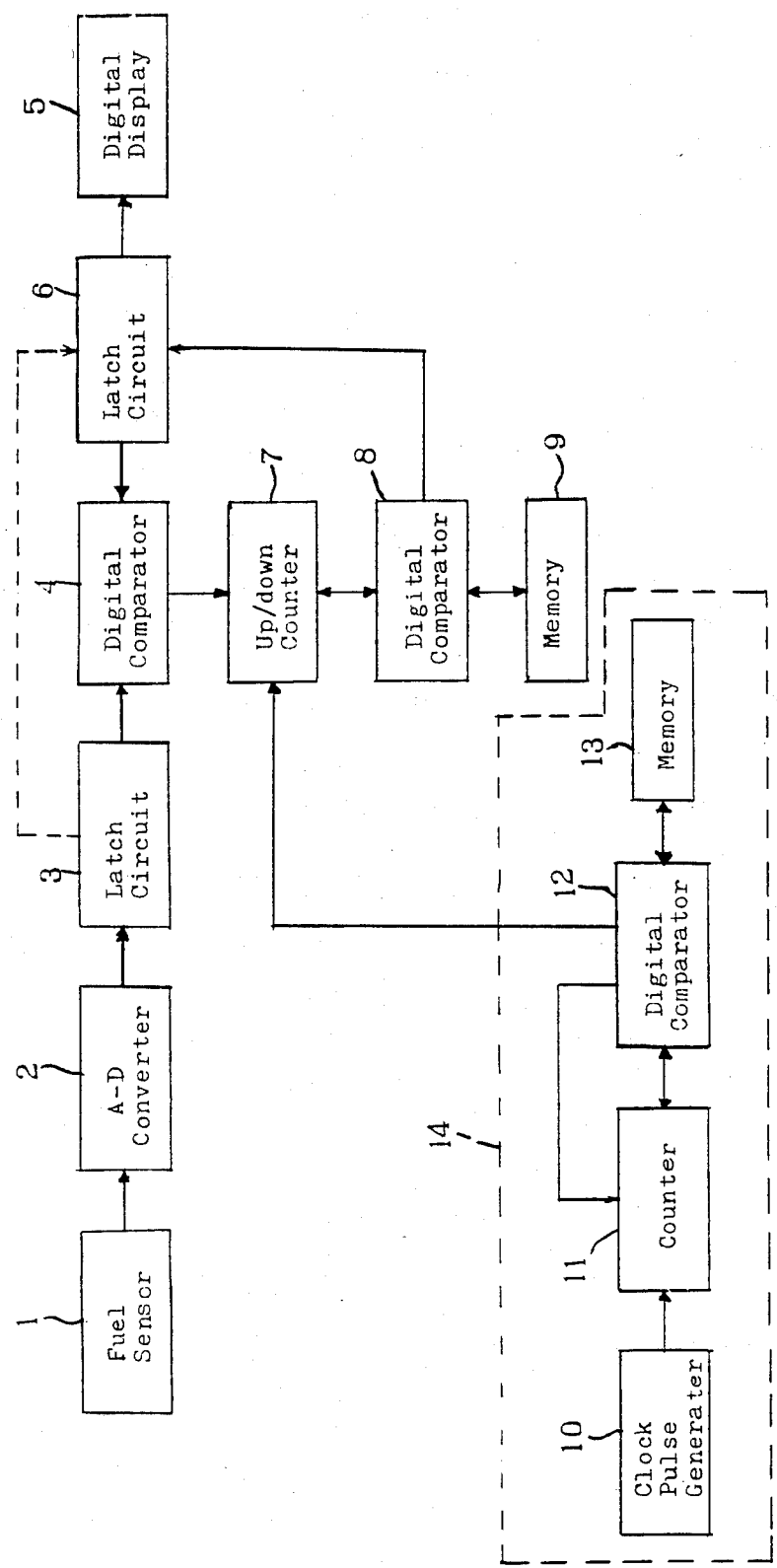
FIG. 1 is a block diagram of a display device according to an embodiment of the present invention.

FIG. 1 is a block diagram of a display device according to an embodiment of the present invention as applied to a fuel meter for an automobile. Referring to FIG. 1, a fuel sensor 1 produces a voltage of a level corresponding to a change in a resistance thereof with vertical movement of a float or the like. An analog signal thus output from the fuel sensor 1 is supplied to an A-D converter 2 which converts it into a digital signal with a predetermined sampling period. The digital signal (sampling data) output by the A-D converter 2 which changes according to the level fluctuations of fuel is supplied to a latch circuit 3 to be latched therein. The sampling data latched by the latch circuit 3 is supplied to one input end of a digital comparator 4 with the predetermined period described above. Present display data latched in another latch circuit 6 connected to a digital display 5 including a decoder driver is supplied to the other input end of the digital comparator 4. Upon the comparison operation, the digital comparator 4 then outputs a difference (including the negative or positive sign) obtained by subtraction of display data from the sampling data to an up/down counter 7. The count value of the up/down counter 7 is sequentially supplied to one input end of another digital comparator 8. A predetermined value stored in a memory 9 in advance is read out therefrom and supplied to the other input end of the digital comparator 8. When the count of the up/down counter 7 reaches the predetermined value, the digital comparator 8 produces outputs to update the display data of the latch circuit 6 and to clear the up/down counter 7. When the count of the up/down counter 7 does not reach the predetermined value read out from the memory 9 within a predetermined period of time, a timer signal generator 14 clears the up/down counter 7. With this arrangement, undesired updating of the display data at the display 5 may be prevented even if the count of the up/down counter 7 reaches the predetermined value after a long period of time. The timer signal generator 14 has a clock pulse generator 10, a counter 11, a memory 13 storing a predetermined value corresponding to a predetermined period of time, and a digital comparator 12 which produces clear signals for clearing the up/down counter 7 and the counter 11 when the count of the counter 11 reaches the predetermined value read out from the memory 13. In this manner, the up/down counter 7 is cleared after a period corresponding to the predetermined value stored in the memory 13. The up/down counter 7 thus periodically accumulates the difference obtained by subtraction of the display data from the sampling data which is obtained from the digital comparator 4. Only when the count reaches the predetermined value read out from the memory 9 within the predetermined period of time, does the digital comparator 8 transfers data to the latch circuit 6 to update display data latched therein.

The mode of operation of the device shown in FIG. 1 will now be described with reference to the flowchart shown in FIG. 2. When the main switch provided in front of a driver seat of an automobile is turned on, the device is energized and measurement of the fuel level is initiated. In steps 1 to 3, the digital signal corresponding to the residual fuel level at the time of energization of the main switch is sampled and latched in the latch circuit 3 as the initial data. The initial data is transferred to the latch circuit 6 to set display data $N_0$ to be compared with sampling data $N_n$ in a later step. The detected fuel level is digitally displayed at the display 5.

In steps 5 and 6, after the display data $N_0$ as the initial value is latched in the latch circuit 6, the subsequent analog signals are converted into digital signals by the A-D converter 2. These digital signals are latched in the latch circuit 3 as sampling data $N_n$. In step 7, the sampling data $N_n$ is supplied to the digital comparator 4 to be compared with the display data $N_0$ which is latched in the latch circuit 6 in steps 1 to 3. During this time interval, clock pulses generated by the clock pulse generator 10 at the timer signal generator 14 are counted by the counter 11. Before steps 5 and 6 described above, time discrimination is made in step 4. In step 4, the digital comparator 12 compares time data t counted by the counter 11 with a predetermined value $t_0$ corresponding to a predetermined period of time stored in the memory 13. If NO is obtained in step 4, the flow advances to steps 11 and 12 to clear the up/down counter 7 and the counter 11. After clearing these counters, the flow returns to step 4 to repeat the routine as described above. On the other hand, if YES is obtained in step 4, the flow advances to steps 5, 6 and 7 described above for executing sampling and comparing operations.

If the display data $N_0$ and the sampling data $N_n$ equal each other in step 7, that is, if there is no fuel level change, the flow also returns to step 4 to repeat the routine until the fuel level change is detected.

If the automobile is subject to vibrations and the fuel level changes accordingly as the automobile travels, the flow advances in the following manner.

Since the fuel level fluctuates having an inherent vibration characteristic responsive to the vibrations of the automobile substantially with reference to a level corresponding to the display data $N_0$ latched in the latch circuit 6, the level of the voltage output from the fuel sensor 1 also changes accordingly. The sampling period of the sampling data $N_n$ latched in the latch circuit 3 is set to the shorter than the fluctuating speed of the output voltage from the fuel sensor 1 which is attributable to the fuel level fluctuations. The difference (including the positive or negative sign) obtained by subtraction of the sampling data $N_n$ from the display data $N_0$ sampled after each sampling period is supplied to the up/down counter 7.

Figure 3:
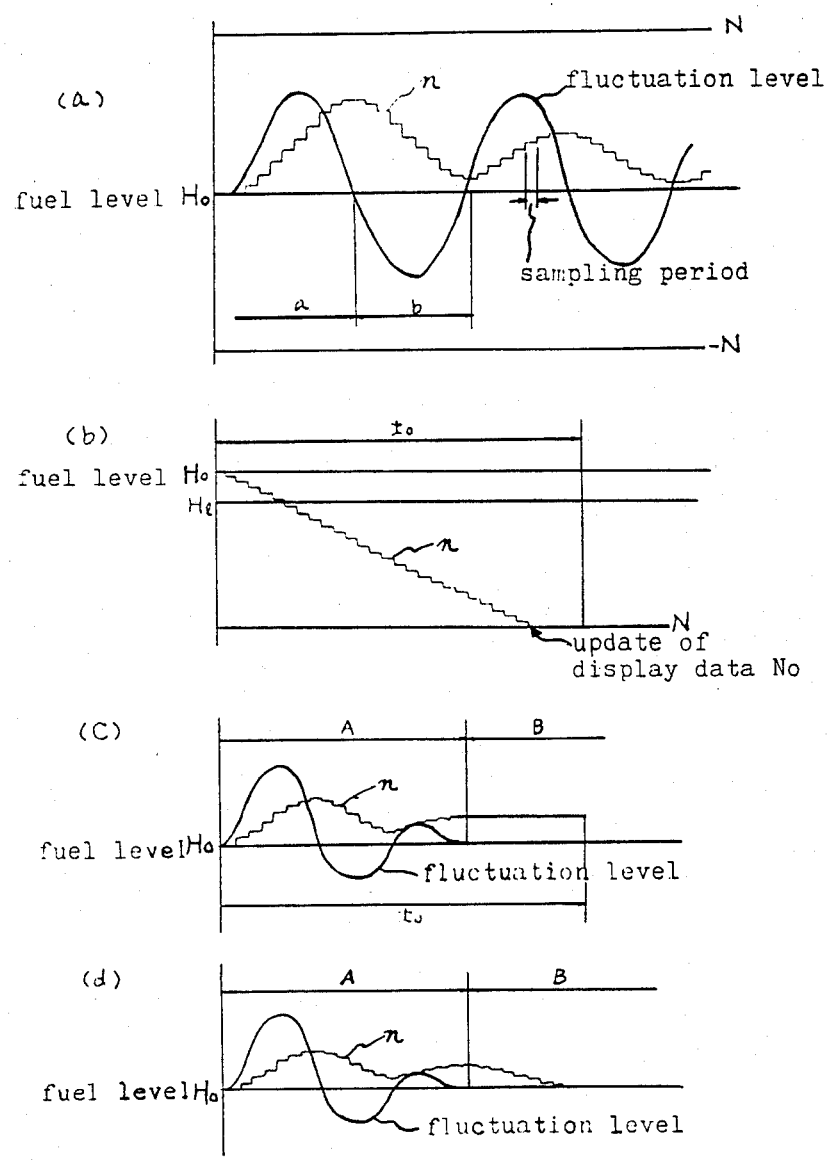
FIG. 3 shows the accumulation signal changes in accordance with fluctuations in the fuel level.

A case of a rising period a from a fuel level $H_0$ corresponding to the display data $N_0$ during the level fluctuations shown in FIG. 3(a) will first be considered. The voltage output from the fuel sensor 1 is raised in level in accordance with the fuel level change and is converted into the digital signal by the A-D converter 2. The digital signal is latched in the latch circuit 3 as updated sampling data $N_n$ after each sampling period. The sampling data $N_n$ is compared with the display data $N_0$ from the latch circuit 6 by the digital comparator 4 in step 7. The digital comparator 4 outputs the difference including the positive or negative sign to the up/down counter 7. The up/down counter 7 counts the transferred digital signals in step 8. It is then discriminated in step 9 if the absolute value of the count of the up/down counter 7 has reached a predetermined value N stored in the memory 9 in advance. Since NO is obtained in step 9 at this stage, the flow returns to step 4 and the same routine is repeated in the rising period a.

Since the sampling data $N_n$ has positive increments relative to the display data $N_0$ in the rising period a, the count of the up/down counter 7 is sequentially incremented as seen from a curve n in FIG. 3(a). If the predetermined value N which is larger than the unit increment or decrement per period of fuel level change is stored in the memory 9, the display data $N_0$ may not be inadvertently updated.

The mode of operation in a lowering period b from the fuel level $H_0$ is similar to that in the rising period a. Since the sampling data $N_n$ has negative increments relative to the display data $N_0$ in the lowering period b, the difference between the data $N_0$ and $N_n$ transferred from the digital comparator 4 has the negative sign and is supplied to the up/down counter 7. Thus, in the lowering period b, the count of the up/down counter 7 counted-up in the rising period a is now counted-down, thus providing a count value corresponding to the fuel level change.

The sequence as described above is performed in the routine from step 4 to step 9 during fuel level fluctuations due to vibrations of the automobile body. As seen from curve n shown in FIG. 3(a), the count of the up/down counter 7 may be suppressed to a value less than the predetermined value N stored in the memory 9 even if the fuel level fluctuates within a relatively wide range. Thus, undesired updating of the display data $N_0$, that is, flicker is prevented and stable display is obtained.

The mode of operation of the device shown in FIG. 1 with little fuel remaining and without much fuel level fluctuations will now be described with reference to FIG. 3(b).

Assume that the fuel level shifts from the fuel level $H_0$ corresponding to the initial display data $N_0$ to a fuel level $H_l$ due to fuel consumption. Then, in the comparator 4, the difference obtained by subtraction of the sampling data $N_n$ from the display data $N_0$ constantly takes a negative value. Therefore, the count of the up/down counter 7 rapidly decreases with the sampling period and finally reaches the predetermined value N stored in the memory 9, in step 9. Then, the operation of the comparison between the sampling data and the display data in step 4 to step 9 is transferred to the updating operation due to the decrease in the fuel level. In step 10, the display data $N_0$ latched in the latch circuit 6 is updated according to the decrease corresponding to the display unit of the digital display 5. In step 11, the up/down counter 7 is cleared. In step 12, the counter 12 is cleared. After step 12, the flow returns to step 4 again to repeat the sampling and comparing sequence from step 4.

The mode of operation as described is the basic mode of operation in the case of stepped changes from the fuel level $H_0$ to $H_l$ with no level fluctuations. In practice, however, the fuel level gradually lowers with level fluctuations. The device of the present invention can measure the average value of such level fluctuations by the up/down counting operation of the up/down counter 7, so that the fuel level may be correctly displayed without flicker and with precision.

FIG. 3(c) shows the operation of the up/down counter 7 when the fuel level changes from the state of fluctuations to the fuel level $H_0$ corresponding to the display data $N_0$ and stabilizes at this level. Since the range of fuel level fluctuations is not symmetrical about the fuel level $H_0$, the count of the up/down counter 7 in a fluctuating period A tends to remain as a positive or negative value. When the fuel level changes to the fluctuating period A through a stable period B, the remaining positive or negative value may result in inadvertent updating of the display data. The procedure for preventing such an erroneous display is performed in step 4.

The timer signal generater 14 continues to count clock pulses in the sampling and comparing sequence as described above. Thus, the clearing operation of the up/down counter 7 is repeated every time the predetermined period of time stored in the memory 13 elapses. When the fuel level attains the stable state B through the fluctuating state A, the remaining positive or negative value in the up/down counter 7 is cleared after the predetermined period of time stored in the memory 13 elapses, so that the erroneous updating of the display due to an accumulating value in fluctuating state A after clearing may be prevented.

The clearing operation of the counter as described above is also performed in the case of the normal fuel level state as shown in FIG. 3(b). Thus, when the clearing operation is performed before the count of the up/down counter 7 reaches the predetermined value N, updating of the display data in accordance with the change in the fuel level may not be performed, resulting in incorrect display. In order to prevent such an erroneous operation, the difference between the sampling data $N_n$ and the display data $N_0$ is preferably supplied to the up/down counter 7 only after it has reached a certain value (so as not to affect the change in the display unit of the display 5). For the same reason, a predetermined value $t_0$ corresponding to the predetermined period of time stored in the memory 13 of the timer signal generator 14 is preferably set to be longer than the time required for the count of the up/down counter 7 to reach the predetermined value N. This time can be shortened by suitable selection of the sampling period.

With the device of the present invention which operates in the manner as described above, stable fuel level display may be performed even if the fuel level is in different states. The device of the present invention absorbs the temporary fluctuations in the fuel level and is excellent in response characteristics.

In the first embodiment of the present invention as described above, the difference between the sampling data $N_n$ and the display data $N_0$ is directly supplied to and accumulated by the up/down counter 7. However, the positive or negative sign between the display data $N_0$ and the sampling data $N_n$ due to the fluctuations in the fuel level may be discriminated and then a predetermined value according to the discrimination result may be supplied to the up/down counter 7 for achieving the similar effects.

Figure 4:
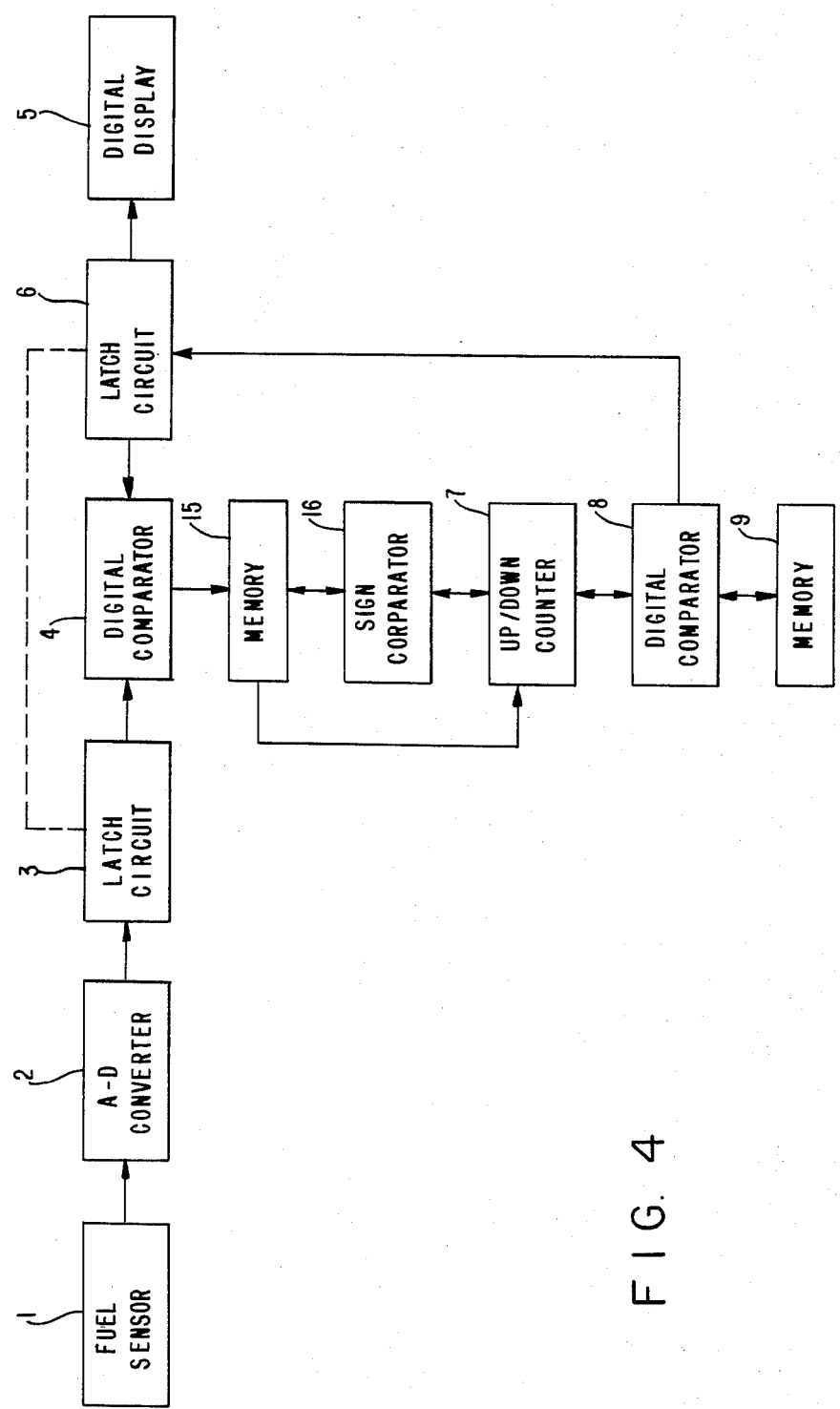
FIG. 4 is a block diagram of a display device according to another embodiment of the present invention.

FIG. 4 is a block diagram of a display device according to the second embodiment of the present invention. The display device of the second embodiment prevents erroneous display due to the accumulation of the remaining positive or negative value of the up/down counter 7 in the fuel state repeating the fluctuating state and the stable state. In the embodiment shown in FIG. 1, the erroneous display is prevented by the clear signals generated by the timer signal generator 14 at a predetermined frequency. On the other hand, according to this second embodiment, the difference between the final sampling data $N_n$ and the display data $N_0$ is stored in a separate memory. After the stable state is established, the difference is subtracted from the remaining value of the up/down counter 7 to restore the initial state.

The mode of sampling and comparing of the device shown in FIG. 4 will now be described. The same reference numerals in FIG. 4 denote the same parts in FIG. 1. In place of the timer signal generator 14, a memory 15 and a sign comparator 16 are incorporated between the digital comparator 4 and the up/down counter 7.

Figure 5:
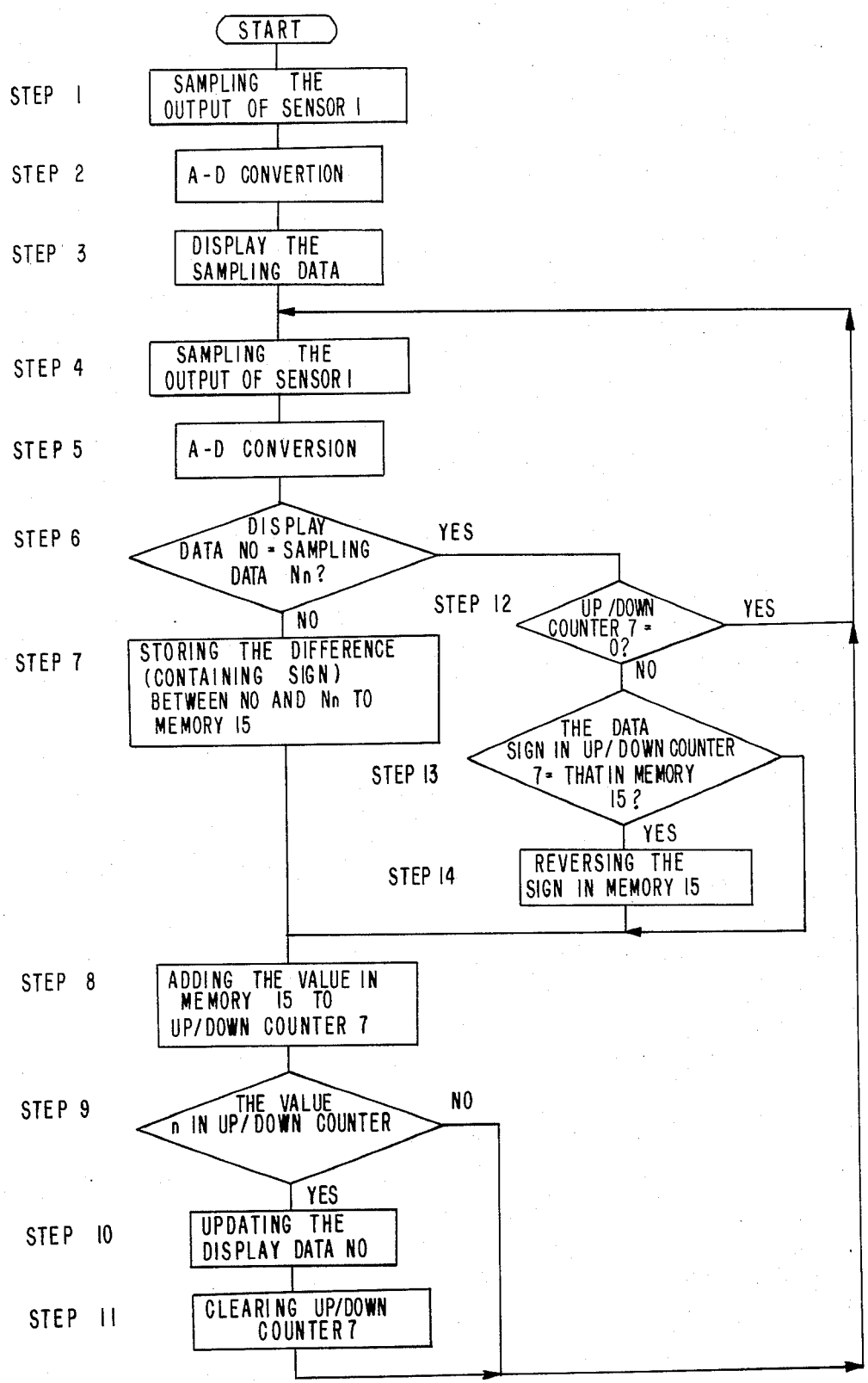
FIG. 5 is a flowchart showing an operation sequence of the device shown in FIG. 4.

FIG. 5 shows the flowchart of the operation of the device shown in FIG. 4. The sequence from steps 1 to 6 is performed in the same manner as steps 1 to 7 in FIG. 2 except the discrimination operation of the counter 11 in step 7.

Since the display data $N_0$ and the sampling data $N_n$ equal each other when there are no fuel level fluctuations, the flow advances to step 12 from step 6. In step 12, it is discriminated if the difference between the display data $N_0$ and the sampling data $N_n$ attributable to level fluctuations is input to the up/down counter 7 or it is discriminated if the count of the up/down counter 7 is zero or a positive or negative value. If the count is zero, the flow returns to step 4. If the count is not 0, the flow advances to step 13. Since there are no level fluctuations and the up/down counter 7 is cleared upon turning on of the main switch in this case, the flow returns to step 4. This routine is repeated until the level fluctuations are detected.

Figure 2:
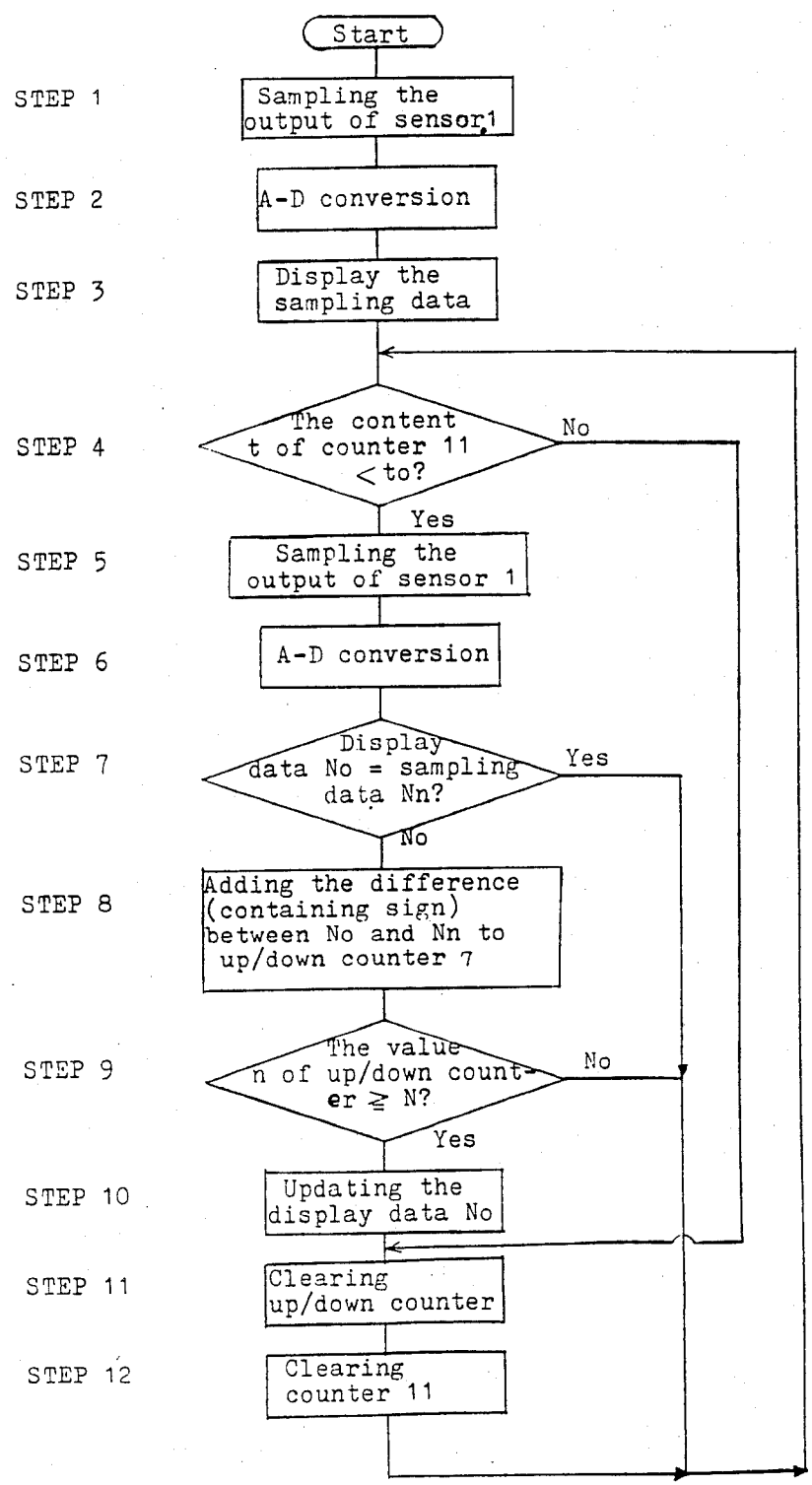
FIG. 2 is a flowchart showing a sampling and comparing sequence of the device shown in FIG. 1.

When there are level fluctuations as shown in FIG. 3(a), the procedure as in steps 8 to 11 in FIG. 2 is performed except that, in steps 7 and 8, the difference between the display data $N_0$ and the sampling data $N_n$ is stored in the memory 15 and is then supplied to the up/down counter 7.

The mode of operation for preventing the erroneous display by subtraction of the difference from the remaining value at the up/down counter 7 when the level attains the stable state through the fluctuating state will now be described with reference to FIG. 3(d).

The sequence includes steps 12, 13 and 14. In step 12, the count of the up/down counter 7 is discriminated. In step 13, the count of the up/down counter 7 is compared with the data sign in the memory 15. In step 14, the data sign stored in the memory 15 is inverted.

Since the sampling data $N_n$ in the stable state B is equal to the display data $N_0$ corresponding to the fuel level $H_0$, after the first sampling operation in the stable state B is compared with the display data $N_0$ in step 6, this operation is transferred to step 12 for discriminating the count of the up/down counter 7. If the count of the up/down counter 7 remains as a positive value, it is transferred to the sign comparator 16. In step 13, the sign of the remaining value is compared with the sign of the difference obtained by subtraction of display data $N_0$ from the sampling data $N_n$ which is stored in the memory 15. If the data stored in the memory 15 is the difference between the final sampling data and the display data in the fluctuating state A and has the positive sign as in the rising period as shown in FIG. 3(d), the sign of the data stored in the memory 15 is inverted in step 14 by comparing this data with the remaining positive value of the up/down counter 7. Then the flow returns to step 8 wherein the data stored in the memory 15 is supplied to the up/down counter 7. Thus, the remaining value in the up/down counter 7 decreases by the data stored in the memory 15. In step 9, the count of the up/down counter 7 is compared with the predetermined value N stored in the memory 9 by the digital comparator 8. The flow then returns to step 4 for performing sampling of the output from the fuel sensor 1. After step 4, since the display data $N_0$ is equal to the sampling data $N_n$ in the stable period B, the flow advances from step 5 to step 12 and then, in step 13, the sign of the remaining value in the up/down counter 7 is compared with the sign of the data stored in the memory 15. Since the sign of the data stored in the memory 15 is different from that of the remaining value in the up/down counter 7 due to the inversion operation in step 14, the flow returns to step 8. In step 8, the data in the memory 15 is added to the count of the up/down counter 7. This routine is repeated until the count of the up/down counter 7 reaches zero.

As may be seen from the embodiments described above, according to the display device of the present invention, the difference obtained by subtraction of the display data $N_0$ from the sampling data $N_n$ is sequentially detected and accumulated. The display data $N_0$ is updated only after the accumulated value reaches a predetermined value. Therefore, the display device of the present invention can absorb irregular fluctuations of measurements by external factors, prevents flicker, allows precise display, and is excellent in response characteristics.

In the embodiments described above, the sampling data output as a digital signal corresponding to the change in the level within a predetermined period is compared with the display data corresponding to the present display at the display device. The value corresponding to the difference is accumulated. The display data is updated when the accumulated value reaches a predetermined value. However, in a third embodiment of the present invention shown in FIG. 6, the input time of the sampling data is sequentially delayed to sequentially calculate the average values of the sampling data within a predetermined period of time. The display data is updated when the average value having a predetermined difference obtained by subtraction of the average value of the sampling data from the display data has been repeated a predetermined number of times.

The same reference numerals in FIG. 6 denote the same parts as in FIG. 1. In the device shown in FIG. 6, the sampling data latched by the latch circuit 3 is sequentially accumulated by an adder 17. The adder 17 is cleared by timer signals of a predetermined period which are generated by the timer signal generator 14. The content of the adder 17 after addition is transferred to a divider 18 which calcualtes the average value of the sampling value during the addition interval. The average value calculated by the divider 18 in every period of timer signal is transferred to a memory 19(1). The average value is then sequentially shifted through series-connected memories 19(2) to 19(n). The average value for n memories 19 is transferred to an averaging circuit 20. The averaging circuit 20 calculates the average of all the sampling data (sampling data input within a period n times the timer signal period) stored in the memory 19. The average value is compared with the display data latched in the latch circuit 6 by the digital comparator 4. The display data latched in the latch circuit 6 in this case is the initial sampling data upon turning on of the main switch. At the same time, the fuel level corresponding to this display data is displayed at the display 5.

The discrimination result (if the difference exceeds a predetermined value) obtained by the digital comparator 4 is transferred to a memory 21 and is then compared with data stored in a memory 23 by a digital comparator 22. The data stored in the memory 21 is sequentially shifted in the memory 23 with the period of the timer signal. The digital comparator 22 compares two discrimination results due to the difference between the display data and the average value of the sampling data at the digital comparator 4. If these discrimination results are not equal to each other, the digital comparator 22 outputs a clear signal to a time counter 24. The time counter 24 counts the clock pulses generated by the timer signal generator 14. When the time counter 24 has counted a predetermined number of clock pulses, it energizes the digital comparator 22 to update the display data in the latch circuit 6 by a value corresponding to the difference stored in the memories 21 and 23.

The time counting operation achieves the same effect as updating the display data when the same difference between the display data and the average values of the sampling data is consecutively obtained a predetermined number of times. Thus, this time discrimination operation absorbs the fuel level fluctuations due to external factors and allows stable display of fuel level.

The sequence of operation of the device shown in FIG. 6 will now be described.

The memory 19 has series-connected memories 19(1) to 19(5) for calculating an average value $X_n$ of sampling data over five periods of the timer signal. The average value $x_n$ of the sampling data within each timer signal period calculated by the divider 18 is transferred to the memory 19(1) and is sequentially shifted in the order of memories 19(2), 19(3), 19(4) and 19(5) upon input of each of subsequent average values $X_n$ (after each timer signal period).

When the main switch (not shown) is turned on, the circuit parts are rendered operative. The fuel sensor 1 starts measuring the fuel level. The initial sampling data converted into the digital data by the A-D converter 2 is latched in the latch circuit 3 and is transferred to the latch circuit 6. The initial sampling data thus sets the display data $N_0$ to be compared with the sampling data average value $X_n$. At the same time the fuel level is digitally displayed at the display 5.

Figure 7:
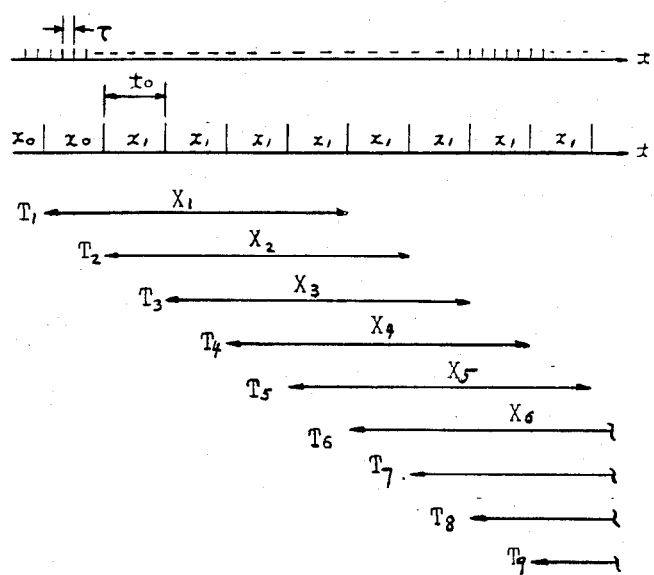
FIG. 7 is a timing chart for explaining the mode of operation of the device shown in FIG. 6.

The sampling data $N_n$ latched in the latch circuit 3 at a predetermined sampling period $\tau$ shown in FIG. 7 is sequentially transferred to the adder 17. The adder 17 calculates the accumulated value of the sampling data $N_n$ transferred within a timer signal period $t_0$ from the timer signal generator 14. The accumulated value of the adder 17 within the timer signal period $t_0$ is transferred to the divider 18 which calculates the average value $x_n$ of the sampling data within the period $t_0$. The average value $x_n$ is sequentially transferred to the memory 19(1) and is shifted to the memories 19(2), 19(3), 19(4) and 19(5) after each timer signal period $T_0$. In this manner, the sampling data average value $x_n$ over consecutive five periods are stored in the series-connected memories 19(1) to 19(5). The sampling data average value $x_n$ sequentially shifted in the memories 19(1) to 19(5) is transferred to the averaging circuit 20 after termination of the shift operation after each timer signal period $T_0$. An average value $X_n$ of the sampling data over five periods of the timer signal is thus calculated. If a calculation time is represented by $T_n$, an average value $X_1$ of the sampling data in the initial calculation period $T_1$ is calculated. The average value $X_1$ is compared with the display data $N_0$ latched in the latch circuit 6 by the digital comparator 4. If a difference exceeds a predetermined value (including the negative or positive sign), the discrimination result is supplied to the memory 21 as a value corresponding to the negative or positive value. The value stored in the memory 21 is then compared with the data stored in the memory 23 by the comparator 22. If they are not the same, the digital comparator 22 outputs a clear signal to the time counter 24.

If the difference is not discriminated by the digital comparator 4, the digital comparator 22 compares the data each stored in the memories 22 and 23 and outputs a clear signal to the time counter 24 independently of the value sequentially shifted. The latch circuit 6 latches the initial display data $N_0$ without any change and displays it without any increments or decrements.

A description will now be made for a case wherein the fuel level lowers by fuel consumption.

When the fuel level lowers from the predetermined level at the initial time of a calculation period $T_2$ of an average value $X_2$, this fuel level is detected by the sensor 1 and the sampling data $N_2$ latched in the latch circuit 3 is accumulated by the adder 17 in accordance with the level. The average value $x_1$ of the sampling data $N_n$ in the timer signal period $t_0$ is supplied to the memory 19(1). Then, the average value $X_1$ of the calculation period $T_1$ including the average value $x_0$ of the sampling data at the memories 19(2) to 19(5) before lowering of the fuel level is calculated by the averaging circuit 20 and is supplied to the digital comparator 4. If the average value $x_1$ of the sampling data stored in the memory 19(1) has a big difference from the average value $x_0$ before the lowering of the fuel level and is obtained as the average value $X_1$ in the calculation period $T_1$, the average value $X_2$ is discriminated as a negative difference from the display data $N_0$ in the latch circuit 6. Then, data corresponding to the negative difference is supplied to the memory 21. At this time, in the memory 23 is stored the discrimination result during the stable period of the average value $x_0$ of the sampling data shifted from the memory 21. Therefore, the digital comparator 23 compares data stored in the memories 21 and 23 and outputs a clear signal to the time counter 24.

Subsequently, when the average value $x_1$ of the sampling data is sequentially supplied to the memory 19(1), an average value $X_3$ in a calculation period $T_3$ calculated by the averaging circuit 20 is similarly compared with the display data $N_0$ latched in the latch circuit 6 by the digital comparator 4. The discrimination result corresponding to the negative difference is supplied to the memory 21 and is compared with the data stored in the memory 23. At this time, since, in the memory 23 is stored the discrimination data between the display data $N_0$ and an average value $X_2$ in a calculation period $T_2$ whrein the average value $x_1$ of the sampling data is input in the initial period thereof. The digital comparator 2 discriminates that the data stored in the memories 21 and 23 is a negative value equal to each other. Thus, the digital comparator 23 does not output a clear signal to the time counter 24, and the time counter 24 continues to count the clock signals.

When the lowering of the fuel level is detected in this manner and average values $X_4$, $X_5$, and so on after a calculation period $T_4$ are sequentially shifted, the discrimination data corresponding to the negative difference in the memories 21 and 23 become constantly equal to each other. Therefore, the digital comparator 22 does not produce a clear signal, and the time counter 24 continues to count the clock pulses. After a predetermined period of time (about five periods of the timer signals), an updating command signal is supplied from the time counter 24 to the digital comparator 22. In response to this updating command signal, the digital comparator 22 outputs updating data corresponding to the discrimination data in the memories 21 and 23, and updates the display data $N_0$ latched in the latch circuit 6 to a value corresponding to the average value $X_1$ of the sampling data.

When the fuel level lowers and the stable state continues for a certain period of time, the display data in the latch circuit 6 is updated to a value corresponding to the lowering fuel level. Thereafter, the discrimination operation with reference to the updated display data is repeated by the sequence as described above. In the detection and discrimination operation described above, the fuel level is assumed to have changed abruptly and have stabilized. However, in practice, the fuel level changes gradually during filling up or consumption. Therefore, the average value $x_n$ of the sampling data sequentially supplied and shifted through the memories 19(1) to 19(5) and the average value $X_n$ in the calculation period T change gradually. However, the comparing operation of the sampling data with the display data by the digital comparator 4 is performed only above a certain predetermined value. Therefore, the display data is updated only when there has been a fuel level change exceeding a predetermined level. Thus, stable digitial display of fuel level may be performed.

When there is an abnormal change in the fuel level due to external factors during the sequence as described above, the sampling data $N_n$ changes according to this change. According to the display device of the present invention, the average value $X_n$ of the sampling data $N_n$ over a considerably long period of time corresponding to n timer signal periods is obtained. This means that the average value of level fluctuations with respect to the normal level is calculated. As a result, the abnormal level fluctuations are absorbed and stable display without variations may be obtained.

Furthermore, since the average value $X_n$ of the sampling data over a period of n timer signal periods is sequentially calculated after each timer signal period, the display updating period can be set to be relatively short, resulting in good response characteristics.

When the level fluctuations are wide in oscillation period range or amplitude level, it suffices to update the display data only after the same comparison result between the display data $N_0$ and the average value $X_n$ of the sampling data at the digital comparator 4 has been consecutively obtained for a predetermined number of times. Then, more stable display may be achieved and excellent abnormal level change absorbing effect under extreme vibration conditions such as those for an automobile fuelometer may be attained.

What is claimed is:

1. A display device comprising: means for displaying display data; sampling means for periodically sampling digital signals corresponding to changes in a quantity to be measured; comparing means for comparing sampling data from said sampling means with said display data to generate a difference signal; accumulating means for accumulating the difference signal generated by said comparing means to output an accumulation signal; and discriminating means for discriminating a large or small relation between the accumulation signal from said accumulating means and a predetermined value, said discriminating means further producing an output signal to update said display data according to said sampling data when said discriminating means discriminates that the accumulation signal has exceeded the predetermined value.

2. A display device according to claim 1, wherein said discriminating means has means for clearing the accumulation signal ever time a timer signal of a predetermined period is output.

3. A display device according to claim 1, wherein said comparing means is provided with means for repeatedly subtracting from the accumulation signal a value corresponding to a final difference between said sampling data and said display data when said comparing means discriminates that said sampling data is equal to said display data and the accumulation signal is available, until the accumulation signal becomes equal to zero.

4. A display device comprising: means for displaying display data; sampling means for periodically sampling digital signals corresponding to changes in a quantity to be measured; average value calculating means for sequentially calculating average values of sampling data from said sampling means within a predetermined period by sequentially delaying input timings of said sampling data from said sampling means; comparing means for comparing an updated value of said display data with each of the average values from said average value calculating means; and counting means for counting the number of the average values having a predetermined difference from the display data in accordance with an output signal from said comparing means, wherein said display data is updated to said average value when the average value having a predetermined difference from said display data has been counted a predetermined number of times.

* * * * *